United States Patent [19]

Morgan

[11] 4,397,549
[45] Aug. 9, 1983

[54] METHOD FOR REMOVAL OF LIDAR BACKGROUND BACKSCATTERING BY SUBTRACTION OF MULTIPLE-DELAYED RETURN SIGNAL

[75] Inventor: Clifford E. Morgan, Springfield, Va.

[73] Assignee: The United States of America as represented by the Secretary of the Army, Washington, D.C.

[21] Appl. No.: 248,629

[22] Filed: Mar. 27, 1981

[51] Int. Cl.³ .................... G01C 3/08; G01N 21/00
[52] U.S. Cl. .................................. 356/5; 343/5 W; 356/342
[58] Field of Search ............... 356/5, 342; 343/5 SM, 343/5 W

[56] References Cited

U.S. PATENT DOCUMENTS

| | | | |
|---|---|---|---|
| 3,650,627 | 3/1972 | Noxon | 343/5 W |
| 4,014,019 | 3/1977 | Fetter | 343/5 W |
| 4,015,257 | 3/1977 | Fetter | 343/5 W |
| 4,217,584 | 8/1980 | Lombardi et al. | 343/5 W |
| 4,289,397 | 9/1981 | Itzkan et al. | 356/5 |

Primary Examiner—S. C. Buczinski
Attorney, Agent, or Firm—Robert P. Gibson; Milton W. Lee; Max L. Harwell

[57] ABSTRACT

In certain light detection and ranging (LIDAR) systems it is necessary to remove the normal aerosol backscattering signal of the atmosphere so that a weak atmospheric turbulence signal of interest, which is present on the backscattering, may be observed. In this disclosure, only one LIDAR pulse is used wherein the return signal is fed equally into four separate delay lines. The four different delayed signals are subtracted to cancel the background and are amplified to give an output signal for which the background is largely removed while retaining the signal of interest. The signal of interest is then amplified and displayed and/or analyzed.

11 Claims, 3 Drawing Figures

METHOD FOR REMOVAL OF LIDAR BACKGROUND BACKSCATTERING BY SUBTRACTION OF MULTIPLE-DELAYED RETURN SIGNAL

The invention described herein may be manufactured, used, and licensed by the U.S. Government for governmental purposes without the payment of any royalties thereon.

BACKGROUND OF THE INVENTION

1. Field of the Invention

The present invention is in the field of laser light wave radar, or light detection and ranging (LIDAR), observation of an atmospheric turbulence feature of interest so that background noise may be removed and the signals of interest amplified and observed.

2. Description of the Prior Art

There is no previous method of doing background scattering removal so that the signal of interest may be extracted from the background, and amplified. However, one way it can be done that has been experimentally tried in a laboratory setting is to send out two laser pulses, one pulse when the turbulence is present and the second pulse when the turbulence has changed, or is absent. One return pulse is subtracted from the other return pulse, thus removing the background scattering from the radar return.

There are disadvantages in using this method of subtracting one pulse from the other in that two LIDAR pulses are required for each set of data. The result is that either twice as much time is required to obtain a set of data, or twice the laser pulse repetition rate is required. If the laser pulse repetition rate is doubled, greater physical demands are placed on the LIDAR and the probability of detection are also increased. The two LIDAR pulses must also be sufficiently separated in time for the backscattering to be distinguishable and the backscattering from at least one of the pulses must be stored for later subtracting. Consequently, the background scattering may change materially between the time of sending the two pulses, leading to effects that may obscure the desired signal. Further, a relatively long delay is necessary between LIDAR pulses when long ranges of the atmosphere are being sampled. In the case of where twice as much time is required to obtain a set of data, not only is waveform storage at high data rates required, but the resolution in amplitude of currently available waveform digitizers is not enough to record weak signals of, say, less than $10^{-3}$ times the background without first removing the ambient $1/R^2$ background. Since range must be resolved to at least 5 meters in order to recover the atmospheric turbulence signal, a time resolution of 15 nanoseconds or better is required in storing the signal. This requirement places a severe demand on the recording equipment.

With the use of LIDAR it is sometimes necessary to remove the background scattering in order to recover the desired signal. The backscattering of the LIDAR pulse by the homogeneous atmosphere can be, for example, one thousand times larger than the modulation of the atmospheric backscattering due to turbulence and falls off with range as $1/R^2$. In order to amplify the backscattering one thousand or more times to detect the turbulence, it is necessary to remove the $1/R^2$ variation of the backscatter so that the signal is effectively flat, i.e. constant with range.

SUMMARY OF THE INVENTION

The present inventive system removes the $1/R^2$ background so that the return signal can be amplified one thousand to one million times to recover a weak modulation of the atmospheric turbulence from a single laser pulse. In addition, if the transient feature of interest is of small amplitude, i.e. less than $10^{-3}$ times the background backscattering, it is difficult, is not impossible, to display the signal after sufficient amplification on an oscilloscope or to digitize the rapidly varying signal at high enough resolution with any available waveform digitizer without first removing the $1/R^2$ variation of the ambient backscattering.

It should also be noted that the short laser pulses required to resolve the turbulence structure imply a rather large detector system bandwidth of from 100 to 200 MHz, high switching rates for digitization of the data, and fast data rate requirements for the system microcomputer or minicomputer.

Two methods for subtracting the background have been used, and theoretically modeled. The first method is comprised of sending two relatively uniform pulses from the LIDAR in which the two pulses are separated by a 100 millisecond time interval, and subtracting the returns to eliminate the background. Since in this time interval the structure of the turbulence or feature of interest will have changed, it will not cancel out on subtraction. On the other hand, the background remains essentially frozen and will therefore cancel. However, this procedure severely distorts the signal from the turbulence. The second method uses only one LIDAR pulse and is the essence of the present invention.

The present inventive embodiment is comprised of a method of taking each of the single LIDAR return signals and feeding equally into three or more, preferably four, separate delay lines. The laser return is thus divided into three or more pulses which are individually delayed, suitable in time, and are recombined in such a way as to remove the $1/R^2$ background to a desired signal. In principle, the initial pulse could be divided into any number of pulses from two on up. However, it will become clear in the following description why four pulses are practical. In order to accomplish this procedure efficiently, it is necessary to know at least approximately the spatial extent and preferably the general location of the atmospheric feature of interest one desires to observe. The length along the LIDAR beam of the features of interest are typically in the range of 5 meters to 30 meters. If the length of the atmospheric feature is designated as S meters, each of the four pulses are delayed for a period of time equivalent to the time required by the LIDAR pulse to traverse the distance S multiplied by a factor $X_i$ where i is the number of the pulse. It should be noted that the LIDAR pulsewidth must be less than S. Thus, the first pulse is delayed by $x_1 S$, the second pulse by $x_2 S$, etc. Each of the delayed pulses are individually amplified and adjacent pairs are algebraically summed with summing amplifiers. Output signals from the summing amplifiers, numbering half the original inputs, are again individually amplified and adjacent pairs are algebraically summed. This summing process is repeated until a single output signal channel is provided. The last summing amplifier that provides the single output signal may be an oscilloscope. The output signal may be amplified and displayed on another oscilloscope or on a transient digitizer.

It should be noted that the four pulses, with three pulses emerging from the three separate delay lines, are delayed in time in such a way that at least one pulse is separated from the others in enough time that the receiver views only the one LIDAR pulse during the time of its field-of-view while all the other pulses are spaced so as to average the $1/R^2$ backscatter of the atmospheric turbulence, and thus cancel the $1/R^2$ background. The laser used in producing the LIDAR return signals may be any laser but a Neodymium: YAG laser and a $CO_2$ laser are mentioned as being appropriate. One example of a typical LIDAR that may be used in the present system is an ILS Nd:YAG LIDAR made by International Laser System, Inc. of Orlando, Florida. The basic components and operation of a pulsed LIDAR are shown on pages 164-174 of a book entitled *Laser Applications*, edited by Monte Ross, and published in 1974 by Academic Press.

DETAILED DESCRIPTION OF THE PREFERRED EMBODIMENT

Figure 1:
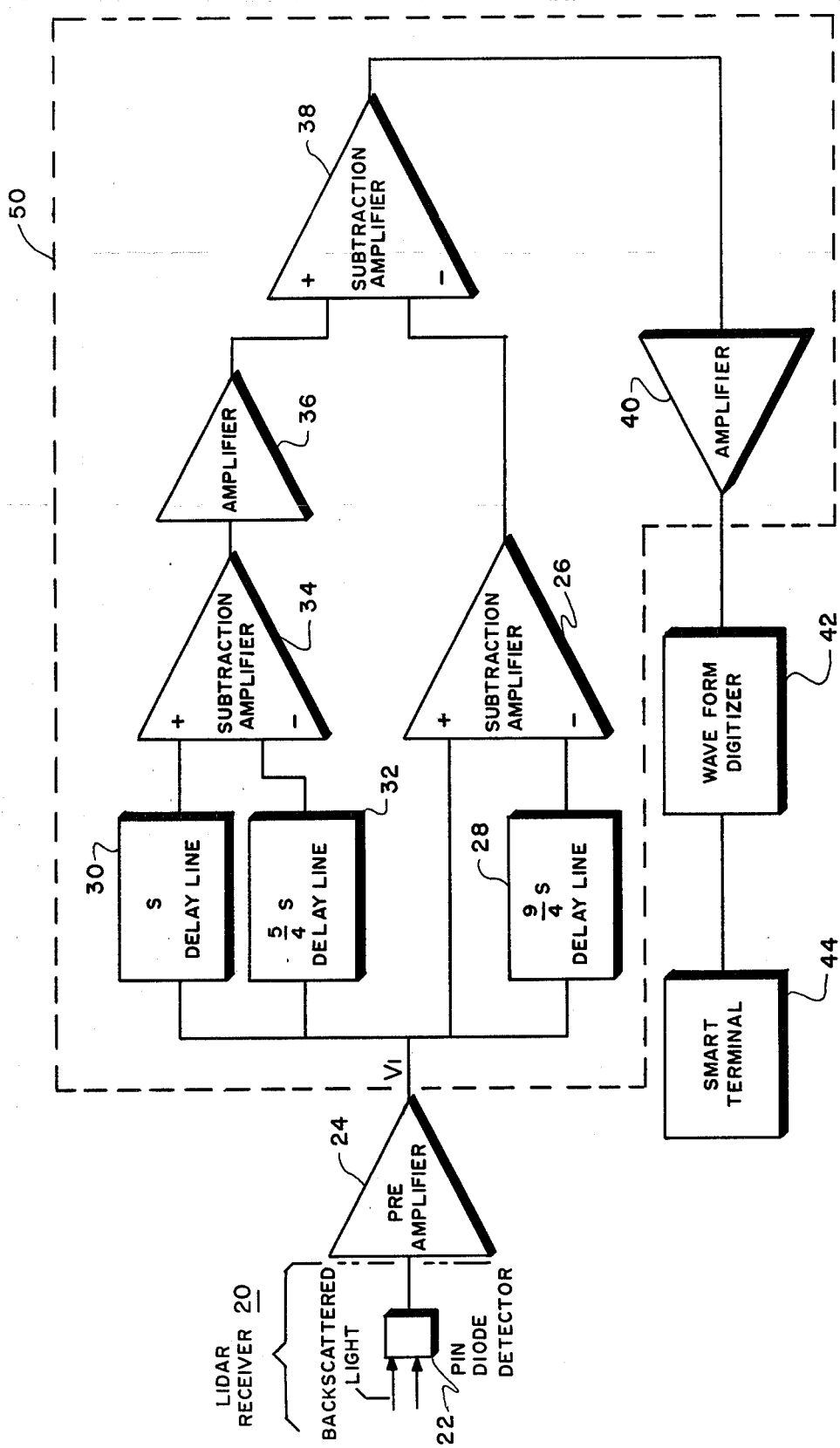
FIG. 1 shows by a schematic block diagram the present multiple-delayed pulse signal processor system.

A discussion of the LIDAR return pulse that is divided into the four delayed pulses and summed in pairs until there is one output pulse wherein the original pulse may be expressed mathematically as follows:

$$V = V_o(1 + F[R])e^{-\mu R}/R^2, \tag{1}$$

where V is the LIDAR output voltage, R is range, Vo is a constant equal to the LIDAR output signal at 1 meter range, $\mu$ is the atmospheric extinction coefficient, and F(R) is the normalized amplitude function of the backscattering feature of interest. Note that if the atmosphere through which the LIDAR pulse propagates is perfectly homogeneous and uniform, then F(R)=0 for all R. On the other hand, if the LIDAR pulse propagates through a non-uniform atmosphere, e.g. through smoke or dust clouds or turbulence, then F(R) is not zero for all R.

The final output signal can therefore be expressed mathematically as follows:

$$V_n = V_o \sum_{i=1}^{n} \frac{G_i(1 + F[R - X_iS])\epsilon^{-\mu(R - X_iS)}}{(R - X_iS)^2} = \tag{2}$$

$$\frac{V_o\epsilon^{-\mu R}}{R^2} \sum_{i=1}^{n} G_i(1 + F_i)\epsilon^{-\mu XS}/\left(1 - \frac{X_iS}{R}\right)^2$$

when n is an integer, $G_i$ is the total gain of the ith signal channel and $F_i = F(R - x_iS)$. For simplicity, we assume that the extinction is small over the distance corresponding to the delays, so that $\epsilon^{-\mu X_iS} \approx 1$. To eliminate the uninteresting signal from the homogeneous and uniform atmosphere, Equation 2 is split into two terms, $$V_n = \frac{V_o\epsilon^{-\mu R}}{R^2}\left[\sum_{i=1}^{n} \frac{G_i}{\left(1 - \frac{X_iS}{R}\right)^2} + \sum_{i=1}^{n} \frac{G_iF_i}{\left(1 - \frac{X_iS}{R}\right)^2}\right] \tag{3}$$

The problem is now to choose the gains ($G_i$'s) and the delays ($x_iS$'s) in Equation (3) such that the first sum is minimized and the second sum is maximized.

If $X_iS/R < 1$, then we may expand the denominators of Equation (3) to obtain, $$V_n = \frac{V_o\epsilon^{-\mu R}}{R^2}\left[\sum_{i=1}^{n} G_i \sum_{j=0}^{\infty}(j+1)\left(\frac{X_iS}{R}\right)^j + \sum_{i=1}^{n} G_iF_i \sum_{j=0}^{\infty}(j+1)\left(\frac{X_iS}{R}\right)^j\right] \tag{4}$$

Grouping terms of equal powers of $X_iS/R$ in the summations, we may restate the problem as follows:

$$\sum_{i=1}^{n} G_iX_i^j = \text{minimum, and} \tag{5}$$

$$\sum_{i=1}^{n} G_iF_iX_i^j = \text{maximum} \tag{6}$$

If we exclude the trivial solutions in which both the $G_i$'s and the $X_i$'s are equal or pairwise equal, i.e. $G_{2i} = G_{2i-1}$, and $x_{2i} = x_{2i-1}$, then Equation (5) can be set equal to zero only for terms from j=0 to j=n-2. It should also be pointed out that negative values of the $x_i$'s are not allowed physically.

By use of Equations (5) and (6), a critical range may be defined at which the residual $1/R^2$ signal first becomes equal to the maximum of the absolute value of F(R), $$R_c = S\left[\frac{n\sum_{i=1}^{n} G_iX_i^{n-1}}{\sum_{i=1}^{n} G_i|F_i|_m}\right]^{1/n-1} \tag{7}$$

where $|F_i|_m$ is the maximum of the absolute value of $F_i$. This result may be greatly simplified by requiring that, $$X_{2i} - X_{2i-1} = 1, \text{ and} \tag{8}$$

$$X_{2i+1} - X_{2i} = b = \text{constant}, \tag{9}$$

and by making use of the property of F(R) that it is zero for R outside its length S. Also, the first delay can be set to zero without loss of generality to that $X_i = 0$ and as a result of Equation (8), $X_2 = 1$.

Consequently, the critical range becomes:

$$R_c = S\left[\frac{nX_2X_3\ldots X_n}{F}\right]^{1/n-1} \quad (10)$$

where $F = |F_1|m$. If Equations (8) and (9) are used, Equation (10) becomes, $$R_c = S\left[\frac{n(1+b)(2+b)(2+2b)(3+2b)\ldots\left(\frac{m-1}{2}(1+b)\right)\left(\frac{l-2}{2}(1+b)+1\right)}{F}\right]^{1/n-1} \quad (11)$$

$$R_c = S\left[\frac{n\left(\frac{m-2}{2}\right)^1(1+b)\frac{m-2}{2}(2+b)(3+2b)\left(\frac{l-2}{2}(1+b)+1\right)}{F}\right]^{1/n-1} \quad (12)$$

where $l=n$ if n is even, and $l=n-1$ if n is odd, and $m=n$ if n is odd and $m=n-1$ if n is even.

The object is to make $R_c$ small for given values of F and S. Apart from the trivial solutions, there are no unique values of the $x_i$'s that minimize $R_c$. However, in practice the $x_i$'s must differ from each other sufficiently that the $G_i$'s provide enough amplification for the signal pulses to differ by significantly more than the system noise level. Experimentally, it was found that the system operated adequately using four delay signals using gains as follows for the four channels.

$$G_2 = -\frac{(2+b)}{b}G_1,\ G_3 = \frac{(2+b)}{b},\ \text{and}\ G_4 = -G_1$$

Negative gain means that the signal in that channel is subtracted from the other channels, while positive gain means the signal is added. It is obvious for very small b some of the channel gains must be very large. In that case, the greatly amplified noise in those channels would ultimately mask the signal due to F(R). Consequently, b should not be made too small.

For purposes of computer simulation, $b=\frac{1}{4}$ was chosen. Since $G_i$ may freely be chosen as 1, this choice of b gives the values of gain, delay length, and other parameters as shown in Table I herein below.

TABLE 1

| n = 4 | b = ¼ |
|---|---|
| $G_1 = 1$ | $G_2 = -9$ |
| $G_3 = 9$ | $G_4 = -1$ |
| $X_1 = 0$ | $X_2 = 1$ |
| $X_3 = 5/4$ | $X_4 = 9/4$ |
| S = 10 meters | μ = 0 |

| A | Rc (meters) |
|---|---|
| .1 | 28.2 |
| .01 | 60.9 |
| .001 | 131 |

In the computer model, the output signal $V_n/V_o$ was computed by use of Equation (3). The factor A determines the amplitude of F(R) relative to the normal $1/R^2$ background backscattering. Computations were made for three values of the parameter A: A=0.1, A=0.01, and A=0.001, corresponding respectively to a strong, a moderate, and a weak feature. To illustrate the usefulness of the signal processing, Equation (3) was plotted first with n=1 to give the normal LIDAR backscattering and then with n=4 for the strong, moderate, and weak features. The first 10 meters at the beginning of the processed signal, i.e. from 164 to 174 meters, yields the features practically undistorted.

In the case that F(R) is periodic with wavelength equal to S, a simple result obtains, and F(R) can be recovered virtually undistorted. Now $x_2-x_1$ is set equal to ½ corresponding to a half wavelength delay and $x_4-x_3$ is set equal to one full wavelength delay, and the gains set so as to subtract the channels pairwise, resulting with $x_2-x_1=\frac{1}{2}$, $x_4-x_3=1$,
$G_1=-G_2$,
$G_3=-G_4$, and because of periodicity, $F_1=-F_2$, and $F_2=+F_4$ Consequently, from Equations (5) and (6), one gets $G_3=-G_1/2$, and $x_3=X_1-\frac{1}{4}$ For simplicity and without loss of generality, $x_3$ can be set to zero and $G_1$ to one, so that finally, $x_1=\frac{1}{4}$, $x_2=\frac{3}{4}$, $x_3=0$, $x_4=1$, $G_1=1$, $G_2=-1$, $G_3=-\frac{1}{2}$, $G_4=+\frac{1}{2}$, and the critical range becomes $$R_c = \frac{S}{2}\sqrt[3]{\frac{3}{2F}}$$

In this case, the critical range is shorter, an advantage which is added to the undistorted signal recovery.

Figure 2:
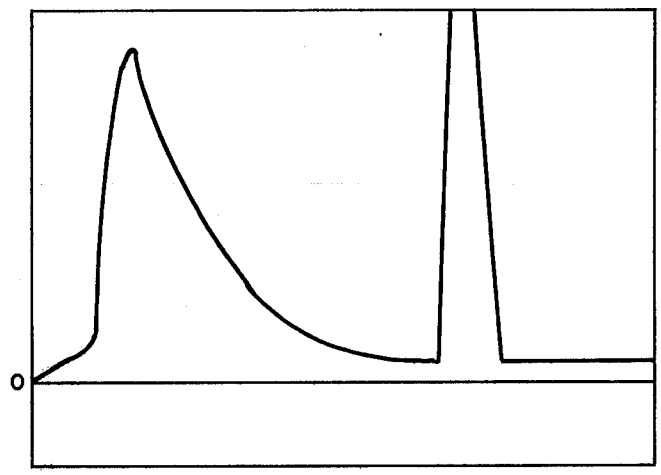
FIG. 2 illustrates a typical unprocessed backscattered pulse signal.
Figure 3:
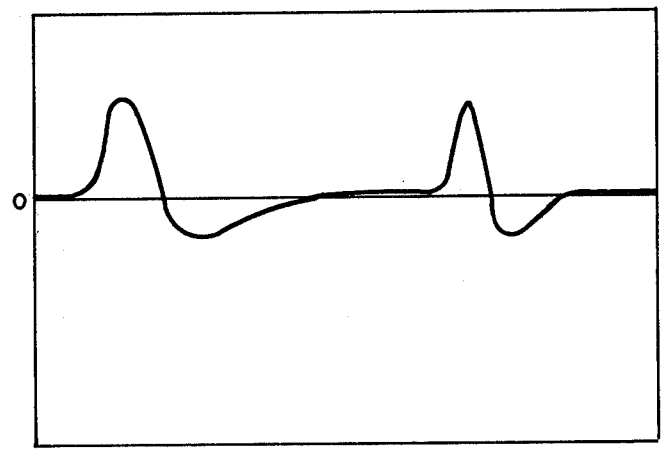
FIG. 3 illustrates the output of the signal processor in the present system.

Refer to FIGS. 1, 2, and 3 for a better understanding of the LIDAR processing method. The multiple-delayed pulse signal processor is shown in FIG. 1. The processor is basically comprised of three wide band summing, or subtraction, amplifiers 26, 34, and 38, a wide band amplifier 36 of suitable gain, and three delay lines 28, 30, and 32, defined respectively as first, second, and third delay lines of appropriate length. In operation, backscatter light from a LIDAR pulse is received in a LIDAR receiver 20 by detector 22, which may be a PIN diode detector made of silicon. The output LIDAR pulse from detector 22 is applied to preamplifier 24. The output from preamplifier 24 is divided into four equal signals, represented by voltages $V_1$, $V_2$, $V_3$, and $V_4$. The first signal $V_1$ is applied directly to the positive terminal of first summing amplifier 26. Second signal $V_2$ is sent through first delay line 28 wherein delay line 28 has a delay time equal to the time it takes the LIDAR pulse to travel a distance equal to 9/4ths the length of the atmospheric turbulence structure, represented as 9/4S, in which the actual length of the atmospheric turbulence structure is represented by the letter S. The delayed output from 28 is applied to the negative terminal of first summing amplifier 26 wherein delayed signal $V_2$ is subtracted from the directly applied signal $V_1$ to cancel the $1/R^2$ background yet retain the small pulses $V_1$ and $V_2$. It should be noted that at the output of first summing amplifier 26, $V_1$ is a negative pulse and $V_2$ is a positive pulse delayed by 9/4S along the time line.

The third signal $V_3$ is sent through a second delay line 30, which has a delay time of equal to the time it takes the laser pulse to travel a distance equal to the atmospheric turbulence wavelength, i.e. length S, and is applied to the positive terminal of second summing amplifier 34. The fourth signal $V_4$ is sent through a third delay line 32, which has a delay time equal to the time it takes the LIDAR pulse to travel a distance equal to the 5/4ths the length of the atmospheric turbulence structure and represented as 5/4S, and is applied to the negative terminal of amplifier 34. Delayed signal $V_4$ is subtracted in amplifier 34 from delayed signal $V_3$ to cancel the $1/R^2$ background yet retain the small pulses $V_3$ and $V_4$. It should also be noted that at the output of the second summing amplifier 34, $V_3$ is a negative pulse and $V_4$ is a positive pulse delayed only ¼ of S from $V_3$, i.e. 5/4S−S distance apart.

The output of the first summing amplifier 26 is applied directly to the negative input terminal of the third summing amplifier 38. However, the output of the second summing amplifier 34 is first amplified by a broadband amplifier 36 with an appropriate gain, such as a multiple of nine for regular signal return or a multiple of two for periodic signal return, and is then applied to the positive terminal of summing amplifier 38. Amplifier 38 subtracts these two input signals to give an output voltage signal, represented as $V_o = (V_3 − V_4)x − (V_1 − V_2)$, where x represents the gain of amplifier 36. Signal $V_o$ is then amplified by a large gain amplifier 40 by a factor of one thousand to one million and is digitized by a wave form digitizer 42 and is displayed at a smart terminal 44. The smart terminal may be a Tektronix Model 4052 oscilloscope. Digitizer 42 may be a Tektronix Model 7912 AD wave form digitizer. Third summing amplifier 38 may be an oscilloscope vertical amplifier, such as a Tektronix Model 7104. Summing amplifiers 26 and 34 and broadband amplifier 36 may be an integral portion of the Tektronix Model 7104 oscilloscope or separate. An operator may adjust amplifiers 36 and 40 to enhance the atmospheric turbulence feature of interest. This is the preferred embodiment of the invention in which the delay lines have low loss and low dispersion at the signal frequencies of interest. Since the delays involved are no more than about 80 nanoseconds, the delay lines may be any non-distorting analog delay lines. The delay line may be made with cable. For example, the delay lines 28, 30, and 32 may be made from suitable lengths of RG-58, 50-ohm coax cable. However, RG-214 double-shielded 50-ohm coax cable mounted in iron boxes for magnetic shielding is preferred. The output signal $V_o$ at the smart terminal 44 is the atmsopheric turbulence feature of interest with the background sufficiently suppressed that the feature of interest may be detected from very close range to infinity.

Experiments were run to confirm the present method, using the same processor as shown in FIG. 1, by extracting background modulation due to turbulence in a 52 meter long tunnel. A Nd:YAG LIDAR was used to obtain backscattering from a smoke aerosol in the tunnel. The backscattering was modulated by means of turbulence from an electric fan located at the end of the tunnel. The backscattering was detected by a PIN diode in the LIDAR receiver and the output thereof was preamplified and fed to the circuit as shown in FIG. 1. Because of the physics of the LIDAR backscattering, a turbulence structure of a certain actual length, represented here also as S, appears to have its length doubled, i.e. two times S, by the backscattering. In addition the electrical signal travels through the delay lines 28, 30, and 32 at a velocity only 0.64 times the velocity of the LIDAR pulse in the tunnel. Therefore, the 5/4 S delay line 32 must be 1.60 S meters long, while the 9/4 S delay line 28 must be 4.55 S meters long and the S delay line 30 must be 1.28 S meters long. Also, in practice the delay lines are lossy and, therefore, some gain must be added to the output signals therefrom in each amplifier 26 and 34 to compensate for these losses. The summing amplifiers 26, 34, and 38 used experimentally were those already built in a Tektronix Model 7104 Oscilloscope. Summing amplifier 26 and 34 were both Tektronix 7S24 plug-in units. The input signal $V_1$ was fed directly to amplifier 26. Input signal $V_2$ was connected to amplifier 26 by delay line 28, comprised of 6.4 meters of RG 58 cable and the input signal $V_4$ was connected to amplifier 34 by delay line 32, comprised of 8.00 meters of RG 58 cable. The input signal $V_3$ was connected to amplifier 34 by delay line 30, comprised of 22.25 meters of RG 58 cable. Both amplifiers 26 and 34 were put in inverted polarity and in the add mode. The vertical mode of the mainframe of the oscilloscope was also put in the add mode. The output signal $V_o$ was then obtained from the signal output BNC connector on the oscilloscope mainframe. The output signal $V_o$ was amplified by amplifier 40 and variously displayed on another oscilloscope 44 and on a transient digitizer 42.

The gain of both channels of amplifier 34 was initially set at nine times the gain of amplifier 26, both channels of which had been set at equal gain appropriate to the backscattered intensity from the LIDAR. After a signal was displayed on the second oscilloscope 44 or the monitor of the transient wave form digitizer 42, the gain of each channel was adjusted to offset the losses in the delay lines and give the flattest signal trace over the longest distance. Typical unamplified backscattered pulse signals by themselves and unprocessed is shown in FIG. 2 in which the atmospheric turbulence is not observable. FIG. 3 shows the output of the present signal processor for the same signal as in FIG. 2. Note also that the signal is well flattened over about 80% of the range of $1/R^2$ backscattering. High amplification of the signal, such as by amplifier 40, over the flat range is clearly possible, so that about four times the range can be amplified when the signal processing method using the multiple-delayed pulse signal processor.

I claim:

1. A multiple-delayed light detecting and ranging (LIDAR) pulse signal processor system for receiving and processing a plurality of LIDAR return pulses transmitted from a LIDAR transmitter for recovering a very weak atmospheric turbulence feature of interest by removing the $1/R^2$ variation of the background aerosol backscattering of each LIDAR pulse by the homogeneous atmosphere so that the background signal is effectively constant with range; said system comprising:

a LIDAR receiver comprised of a detector for detecting each LIDAR return pulse from the atmosphere and a preamplifier that amplifies said LIDAR return pulse;

a multiple-delayed LIDAR pulse signal processor comprised of a plurality of separate delay lines and a plurality of summing amplifiers for dividing each LIDAR return pulse into a multiple of delayed pulses which are identical to said LIDAR return pulse but each having a different delay time wherein said multiple of delayed pulses are summed in pairs by said plurality of summing amplifiers until there is a single output signal in which the $1/R^2$ variation of the background aerosol backscattering of each LIDAR pulse is removed and said single output signal is amplified by a large gain amplifier to recover said very weak atmospheric feature of interest; and display means for showing amplified weak atmospheric turbulence feature of interest with said $1/R^2$ variation of background backscattering sufficiently suppressed that the weak atmospheric turbulence feature of interest may be detected from very close range to infinity for analyzing and determining the position of the source causing said atmospheric turbulence feature of interest.

2. A system as set forth in claim 1 wherein said plurality of delay lines are three designated as first, second and third delay lines and said plurality of summing amplifiers are three designated as first, second, and third summing amplifiers in which said LIDAR return pulse is divided into four equal signals selectively delayed with respect to each other wherein said LIDAR return pulse is connected directly to the positive terminal of said first summing amplifier and said second signal is connected to the negative terminal of said first summing amplifier through said first delay line having a delay time equal to the time it takes the LIDAR pulse to travel a distance equal to 9/4ths the length of the atmospheric turbulence feature of interest wavelength and said three signal is connected to the positive terminal of said second summing amplifier through said second delay line having a delay time equal to the time it takes the LIDAR pulse to travel a distance equal to the atmospheric turbulence feature of interest wavelength and said fourth signal is connected to the negative terminal of said second summing amplifier through said third delay line having a delay time equal to the time it takes the LIDAR pulse to travel a distance equal to 5/4ths the length of the atmospheric turbulence feature of interest wavelength wherein said first summing amplifier subtracts said second signal from said first signal and applies the resulting signal to the negative terminal of said third summing amplifier and said second summing amplifier subtracts said fourth signal from said third signal and applies the resulting signal to a wide band amplifier for amplifying the resulting signal by at least a gain of two wherein the amplified resulting signal is applied to the positive terminal of said third summing amplifier wherein said single output signal is produced at the output of said third summing amplifier and said large gain amplifier amplifies said single output signal by a multiple of from one thousand to about one million.

3. A system as set forth in claim 2 wherein said first, second, and third delay lines are made of cable of suitable length.

4. A system as set forth in claim 3 wherein said delay line cable is RG-214 double-shielded 50-ohm coaxial cable mounted in iron boxes for magnetic shielding.

5. A system as set forth in claim 3 wherein said delay line cable is RG-28, 50-ohm coaxial cable.

6. A system as set forth in claim 2 wherein said first, second and third delay lines are any non-distorting analog delay lines.

7. A system as set forth in claim 4 wherein said display means is comprised of a wave form digitizer for digitizing the amplified single output signal and a smart terminal.

8. A system as set forth in claim 7 wherein said smart terminal is an oscilloscope for direct viewing.

9. A system as set forth in claim 8 wherein said third summing amplifier is an oscilloscope and said first and second summing amplifiers and said broadband amplifier are an integral portion thereof wherein said first and second summing amplifiers are adjustable to give a flat signal trace on said third summing amplifier oscilloscope wherein said broadband amplifier and said large gain amplifier are adjustable to provide gain to have said atmospheric turbulence feature of interest more clearly defined at said smart terminal.

10. A system as set forth in claim 9 wherein said detector is a PIN diode detector.

11. A system as set forth in claim 10 wherein said PIN diode detector is made of silicon.

* * * * *